Patented Mar. 20, 1928.

1,663,476

UNITED STATES PATENT OFFICE.

CLARK W. DAVIS, OF CHESTER, PENNSYLVANIA, ASSIGNOR TO E. I. DU PONT DE NEMOURS & COMPANY, OF WILMINGTON, DELAWARE, A CORPORATION OF DELAWARE.

PROCESS OF PRODUCING AROMATIC AMINES.

No Drawing. Application filed April 24, 1925. Serial No. 25,684.

My invention relates to a process of producing aromatic amines by reduction of the corresponding nitrocompounds with iron and water in the presence of certain promoters. The object of my invention is to provide a new and economical process for the production of such amines as aniline, toluidine, xylidine, metaphenylenediamine and alphanaphthylamine which are of such basic importance to the dyestuffs and other industries.

Amines of the class mentioned above are commonly produced by reduction of the proper nitro-aromatic compound by means of iron and water using a relatively small quantity of either hydrochloric acid or ferrous chloride as a catalyst or promoter. Both of these are relatively expensive, and hydrochloric acid has the further objection of being very corrosive and difficult to handle. To the best of my knowledge, the exact function of these promoters is not definitely known and so far as I am aware no promoters other than the two mentioned have found practical application.

I have discovered that sulphuric acid or acid sulphates promote the reduction of nitro-aromatic compounds equally as well as either hydrochloric acid or ferrous chloride, producing amines of entirely satisfactory quality and in good yield. I have found that sulphuric acid and acid sulphates give identical results and for the purposes at hand I consider them practical equivalents. For example, sodium acid sulphate, $NaHSO_4$, can be considered as having 40.8% available sulphuric acid, and when used in an amount corresponding to its available sulphuric content gives the same result as an equivalent amount of sulphuric acid. The acid sulphate, which I prefer to use, is the sodium acid sulphate in the form of nitre cake, obtained as a by-product in the manufacture of nitric acid.

I have also discovered that a mixture of sulphuric acid and a chloride of an alkali-metal or alkaline earth metal will promote the reduction of nitro-aromatic compounds of the class mentioned more advantageously than sulphuric acid alone, producing amines of satisfactory quality and in good yield. Such a combination is more economical than either ferrous chloride or hydrochloric acid, and is simpler to handle and less corrosive than the latter. In carrying out this modification of my process, I may mix the acid and the chloride just before introducing them into the reducing vessel, or, as I prefer, I may add them directly to the reducer charge without any preliminary mixing. For sulphuric acid, I prefer to use the acid sulphate, commonly called nitre cake, as above described.

Though my invention is applicable to the production of aromatic amines in general, I shall illustrate my invention by describing its application to the manufacture of aniline from nitrobenzene.

*Example I.*

No special equipment is necessary in order to carry out my process, which differs from the common industrial processes for the manufacture of aniline only in the use of sulphuric acid or its equivalent in place of ferrous chloride or hydrochloric acid. The sulphuric acid or acid sulphate is added at the start of the process or may be added in small portions throughout the reduction. The contents of the reducer should be agitated and kept under constant reflux. At the start the charge should consist of a portion of the iron in a finely divided state plus the necessary amount of water containing at least a portion of the sulphuric acid. To this, from time to time, should be added both nitrobenzene and iron in the usual proportions. More sulphuric acid can be added from time to time if the reduction tends to lag. After the nitrobenzene and iron have been added up to the capacity of the reducer the refluxing of the charge should be continued until all or substantially all of the nitrobenzene has been reduced. The aniline can then be separated from the reducer charge by any of the well-known known methods, for example by steam distillation.

The proportion of sulphuric acid or nitre cake can be varied over a wide range, but I have found that for each 100 lbs. of nitrobenzene approximately 2 lbs. of sulphuric or 6 lbs. of nitre cake analyzing 31% $H_2SO_4$ give entirely satisfactory results. The strength of the sulphuric acid is immaterial. The nitre cake should be crushed or ground to a size suitable for feeding to the reducer charge.

Example II.

The sulphuric acid and sodium chloride are added to the reaction vessel at the start of the process, or may be added in small portions throughout the reduction. The contents of the reducer should be agitated and kept under constant reflux by heating. At the start, the charge should consist of a portion of the iron plus the necessary amount of water containing at least a portion of the sulphuric acid and sodium chloride. To this, from time to time should be added both nitrobenzene and iron in the usual proportions. More sulphuric acid and sodium chloride can be added from time to time if the reduction tends to lag. After the nitrobenzene and iron have been added up to the capacity of the reducer, the refluxing of the charge should be continued until all or substantially all of the nitrobenzene has been reduced. The aniline can then be separated from the reducer charge by any of the well-known methods, for example, by steam distillation.

The proportion of sulphuric acid and salt may be varied over a wide range, but I have found that for each 100 lbs. of nitrobenzene approximately 2 lbs. of sulphuric acid and 2.4 lbs. of salt or 6 lbs. of nitre cake and 2.4 lbs. of salt give satisfactory results. It is desirable that the salt be present in sufficient amount to use up the sulphuric acid or the acidity of the nitre cake.

I claim:

1. A process of producing an aromatic amine which comprises reducing a nitro-aromatic compound with iron and water in the presence of sulphuric acid and a chloride of an alkali-forming metal.

2. A process of producing an aromatic amine which comprises reducing a nitro-aromatic compound with iron and water in the presence of sulphuric acid and sodium chloride.

3. A process of producing aniline which comprises reducing nitrobenzene with iron and water in the presence of sulphuric acid and sodium chloride.

In testimony whereof I affix my signature.

CLARK W. DAVIS.